United States Patent
Zhang et al.

(10) Patent No.: US 12,440,480 B2
(45) Date of Patent: Oct. 14, 2025

(54) USE OF NAPHTHYLUREA COMPOUND

(71) Applicant: SUZHOU RAYMON PHARMACEUTICALS COMPANY, LTD., Suzhou (CN)

(72) Inventors: Fei Zhang, Suzhou (CN); Sen Wang, Suzhou (CN); Yanhong Zhang, Suzhou (CN)

(73) Assignee: SUZHOU RAYMON PHARMACEUTICALS COMPANY, LTD. (CN)

( * ) Notice: Subject to any disclaimer, the term of this patent is extended or adjusted under 35 U.S.C. 154(b) by 729 days.

(21) Appl. No.: 17/785,713

(22) PCT Filed: Dec. 16, 2019

(86) PCT No.: PCT/CN2019/125567
§ 371 (c)(1),
(2) Date: Jun. 15, 2022

(87) PCT Pub. No.: WO2021/119902
PCT Pub. Date: Jun. 24, 2021

(65) Prior Publication Data
US 2023/0062969 A1    Mar. 2, 2023

(51) Int. Cl.
*A61K 31/437*    (2006.01)
*A61K 31/416*    (2006.01)
*A61P 27/02*    (2006.01)

(52) U.S. Cl.
CPC .......... *A61K 31/437* (2013.01); *A61K 31/416* (2013.01); *A61P 27/02* (2018.01)

(58) Field of Classification Search
CPC ...... A61K 31/437; A61K 31/416; A61P 27/02
USPC ........................................................ 514/303
See application file for complete search history.

(56) References Cited

U.S. PATENT DOCUMENTS 9,469,639 B2    10/2016   Hu et al.

FOREIGN PATENT DOCUMENTS

| CN | 103524421 A  | 1/2014  |
|----|--------------|---------|
| EP | 3050881 A1   | 8/2016  |
| JP | 2016531936 A | 10/2016 |
| WO | 2014201127 A2| 12/2014 |

OTHER PUBLICATIONS

The First Action issued in Chinese Patent Application No. 2019800996009 mailed May 27, 2023.
Li Li G. et.al."Inhibition of corneal neovascularization by tyrosine protein kinase inhibitor" Laser Journal. 2010, 31(3): 80-81.
The First Office Action issued in Japanese Patent Application No. 2022-53662 mailed Jun. 2, 2023.
The Extended European Search Report for European Patent Application No. 199563123 mailed Jul. 21, 2023.
The First Office Action issued in Australia Patent Application No. 2019478778 mailed Dec. 16, 2019.
International Search Report in related PCT/CN2019/125567, dated Sep. 27, 2020, 8 pages.
PCT Written Opinion in related PCT/CN2019/125567, dated Sep. 27, 2020, 5 pages.
Berge et al., "Pharmaceutical Salts", Journal of Pharmaceutical Science, vol. 66, No. 1, pp. 1-19, Jan. 1977.
Stahl, et al., Handbook of Pharmaceutical Salts: Properties, Selection, and Use, Wiley-VCH, Chemistry International, vol. 24, No. 3, 1 page, 2002.
International Preliminary Report on Patentability issued in International Patent Application No. PCT/CN2019/125567, 13 pages, May 17, 2022.
Second Chinese Office Action issued in Chinese Patent Application No. 201980099600.9, dated Oct. 9, 2023.

*Primary Examiner* — Kristin A Vajda
(74) *Attorney, Agent, or Firm* — Dilworth IP, LLC

(57) ABSTRACT

The present invention provides use of substance A in the preparation of a medicament. The substance A is a naphthylurea compound as shown in formula I, a pharmaceutically acceptable salt thereof, a solvate thereof, a solvate of the pharmaceutically acceptable salt thereof, a crystal form thereof or a tautomer thereof, and the medicament is a medicament for treating a corneal neovascular disease. The naphthylurea compound of the present invention can treat the corneal neovascular disease by means of eye dropping administration.

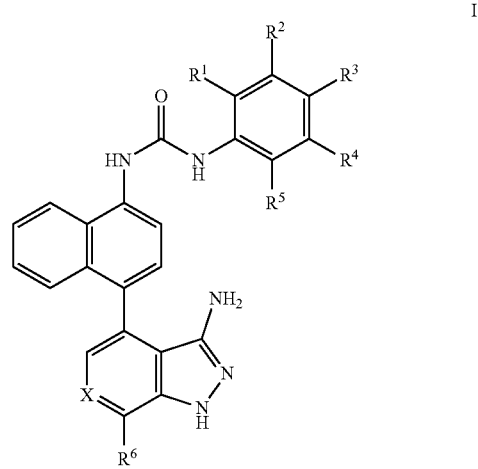

13 Claims, No Drawings

USE OF NAPHTHYLUREA COMPOUND

TECHNICAL FIELD

The present disclosure relates to a use of a naphthylurea compound.

BACKGROUND

The cornea is an important component of the refractive media of the eye, which is transparent and avascular. The transparent cornea is very important to maintain the function of the eyes to see light. The avascular state of the cornea is based on the low level of angiogenic factors and the high level of anti-angiogenic factors. In pathological conditions, a balance between the angiogenic factors and the anti-angiogenic factors of the corneal is disrupted, resulting in pathological conical neovascularization (CNV).

In the field of pharmaceutical research, the same mechanism of action has the same principle, but it is not necessarily to have an effect on all diseases related to the principle. Due to specific action conditions such as different administration methods, absorption, metabolism, concentration, and environment, effects of the same medicament on different parts are different.

CONTENT OF THE PRESENT INVENTION

The technical problem to be solved by the present disclosure is the single structure of existing medicaments for treating ophthalmic diseases related to corneal neovascularization. Therefore, the present disclosure provides a use of a naphthylurea compound. The compounds can treat the ophthalmic diseases related to corneal neovascularization by administration method of eye drops, fill the gaps in the field, and have significant social and economic benefits.

The present disclosure provides a use of a substance A in the manufacture of a medicament, wherein the substance A is a naphthylurea compound as shown in formula I, a pharmaceutically acceptable salt thereof, a solvate thereof, a solvate of the pharmaceutically acceptable salt thereof, a crystal form thereof or a tautomer thereof, and the medicament is a medicament for treating a corneal neovascular disease;

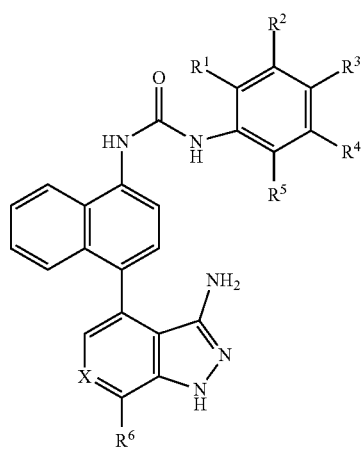

I wherein, $R^1$, $R^2$, $R^3$, $R^4$, and $R^5$ are independently selected from H, halogen, or $C_1$-$C_6$ alkyl;

X is CH or N;
$R^6$ is H or —O—$(CH_2)_n$—Y;
Y is 5- to 6-membered heterocycloalkyl in which the heteroatoms are N, and the number of the heteroatoms is 1 to 2;
n is 2, 3, 4 or 5.

In $R^1$, $R^2$, $R^3$, $R^4$ or $R^5$, the halogen may be fluorine, chlorine, bromine or iodine, for example, the halogen is fluorine.

In $R^1$, $R^2$, $R^3$, $R^4$ or $R^5$, the $C_1$-$C_6$ alkyl may be $C_1$-$C_3$ alkyl, for example, the $C_1$-$C_6$ alkyl is methyl, ethyl, n-propyl or isopropyl.

In Y, the 5- to 6-membered heterocycloalkyl may be 5- to 6-membered heterocycloalkyl containing one N, for another example, the 5- to 6-membered heterocycloalkyl is

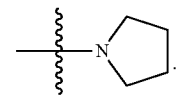

In $R^6$, preferably, n is 2 or 3 (e.g., 3).

In the present disclosure, preferably, one to two of $R^1$, $R^2$, $R^3$, $R^4$, and $R^5$ are independently $C_1$-$C_3$ alkyl (e.g., methyl), and others are independently halogen or H.

In the present disclosure, preferably, three to four of $R^1$, $R^2$, $R^3$, $R^4$, and $R^5$ are independently H, and others are independently halogen (e.g., fluorine) or $C_1$-$C_3$ alkyl (e.g., methyl).

In a certain embodiment, certain groups of the naphthylurea compound as shown in formula I are defined as below, and other groups that are not defined are as described in any one of the above embodiments:
X is CH, and $R^6$ is —O—$(CH_2)_n$—Y.

In a certain embodiment, in the naphthylurea compound as shown in formula I, the pharmaceutically acceptable salt thereof, the solvate thereof, the solvate of the pharmaceutically acceptable salt thereof, the crystal form thereof or the tautomer thereof, certain groups are defined as below, and other groups that are not defined are as described in any one of the above embodiments:
X is N, and $R^6$ is H.

In a certain embodiment, in the naphthylurea compound as shown in formula I, the pharmaceutically acceptable salt thereof, the solvate thereof, the solvate of the pharmaceutically acceptable salt thereof, the crystal form thereof or the tautomer thereof, certain groups are defined as below, and other groups that are not defined are as described in any one of the above embodiments:

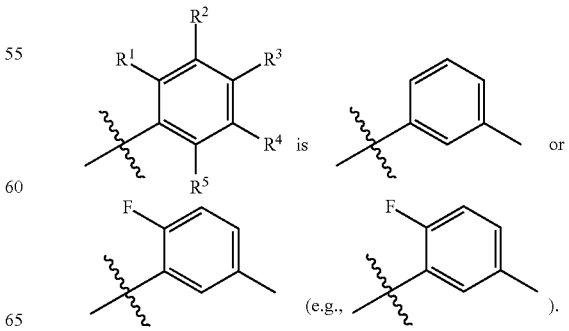

In a certain embodiment, in the naphthylurea compound as shown in formula I, the pharmaceutically acceptable salt thereof, the solvate thereof, the solvate of the pharmaceutically acceptable salt thereof, the crystal form thereof or the tautomer thereof, certain groups are defined as below, and other groups that are not defined are as described in any one of the above embodiments:

when X is N and $R^6$ is H, three to four of $R^1$, $R^2$, $R^3$, $R^4$, and $R^5$ are independently H, and others are independently halogen (e.g., fluorine) or $C_1$-$C_3$ alkyl (e.g., methyl);

when X is CH and $R^6$ is —O—$(CH_2)_n$—Y, one of $R^1$, $R^2$, $R^3$, $R^4$, and $R^5$ is halogen (e.g., fluorine), one of $R^1$, $R^2$, $R^3$, $R^4$, and $R^5$ is $C_1$-$C_3$ alkyl (e.g., methyl), and others are H.

In the present disclosure, preferably, the naphthylurea compound as shown in formula I is selected from any one of the following structures:

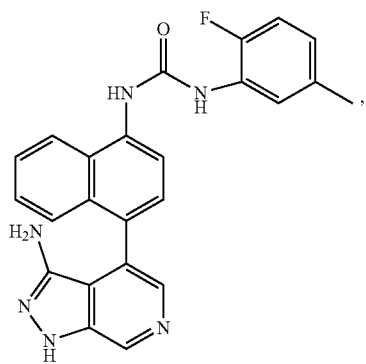

III

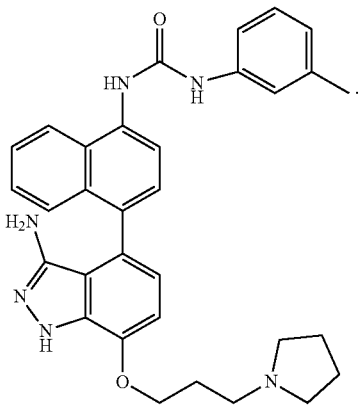

VI

IV

V

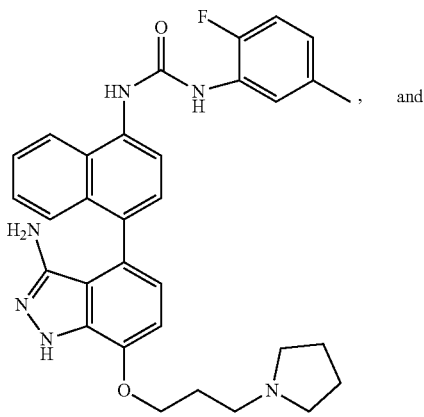

and

In the use, the dosage form of the medicament may be an eye drop.

In the eye drop, preferably, the mass concentration of the substance A is 10-30 mg/mL (e.g., 20 mg/mL).

The eye drop refers to a sterile liquid formulation prepared from a medicament and an appropriate ophthalmic pharmaceutical excipient. The eye drop may be an aqueous solution eye drop, an oily solution eye drop, a suspension eye drop or an emulsion eye drop.

The present disclosure also provides a pharmaceutical composition, comprising the above substance A and an ophthalmic pharmaceutical excipient.

In the present disclosure, preferably, the pharmaceutical composition is a pharmaceutical composition for treating a corneal neovascular disease.

The dosage form of the pharmaceutical composition may be an eye drop.

In the eye drop, preferably, the mass concentration of the substance A is 10-30 mg/mL (e.g., 20 mg/mL).

The present disclosure also provides a substance A for treating a corneal neovascular disease, wherein the substance A is as described above.

The present disclosure provides a method for treating a corneal neovascular disease in a patient in need thereof, comprising: administrating a therapeutically effective amount of the above substance A or the above pharmaceutical composition to the patient in need thereof.

In the method, the substance A or the pharmaceutical composition may be "administrated" in the form of an eye drop.

In the method, the patient may be a mammal, for example, the patient is a rabbit or human.

In the method, the substance A or the pharmaceutical composition may be administered according to a conventional dosage, and based on the substance A, a non-limiting example range may be 1-3 mg/eye (single dosage), for example, the dosage is 1 mg/eye.

In the method, the frequency of administration of the substance A or the pharmaceutical composition may be four times a day.

Unless otherwise specified, the terms used in the present disclosure have the following meanings:

The term "pharmaceutically acceptable salt" refers to salt prepared from the compound of the present disclosure and a relatively non-toxic and pharmaceutically acceptable acid or alkali. When the compound of the present disclosure contains relatively acidic functional groups, an alkali addition salt can be obtained by allowing a sufficient amount of pharmaceutically acceptable alkali to be in contact with the compound in the neutral form in a pure solution or an appropriate inert solvent. The pharmaceutically acceptable alkali includes, but is not limited to, lithium salt, sodium salt, potassium salt, calcium salt, aluminium salt, magnesium salt, zinc salt, bismuth salt, ammonium salt, and diethanolamine salt. When the compound of the present disclosure contains relatively alkaline functional groups, an acid addition salt can be obtained by allowing a sufficient amount of pharmaceutically acceptable acid to be in contact with the compound in the neutral form in a pure solution or an appropriate inert solvent. The pharmaceutically acceptable acid includes inorganic acid, and the inorganic acid includes, but is not limited to, hydrochloric acid, hydrobromic acid, hydroiodic acid, nitric acid, carbonic acid, phosphoric acid, phosphorous acid, sulfuric acid, etc. The pharmaceutically acceptable acid includes organic acid, and the organic acid includes, but is not limited to, acetic acid, propionic acid, oxalic acid, isobutyric acid, maleic acid, malonic acid, benzoic acid, succinic acid, suberic acid, trans-butenedioic acid, lactic acid, mandelic acid, phthalic acid, benzenesulfonic acid, p-toluenesulfonic acid, citric acid, salicylic acid, tartaric acid, methanesulfonic acid, isonicotinic acid, acidic citric acid, oleic acid, tannic acid, pantothenic acid, bitartrate, ascorbic acid, gentisic acid, fumaric acid, gluconic acid, saccharic acid, formic acid, ethanesulfonic acid, pamoic acid (i.e., 4,4'-methylene-bis(3-hydroxy-2-naphthoic acid)), amino acid (e.g., glutamic acid and arginine), etc. When the compound of the present disclosure contains relatively acidic functional groups and relatively alkaline functional groups, it can be converted into an alkali addition salt or an acid addition salt. For details, see Berge et al., "Pharmaceutical Salts", Journal of Pharmaceutical Science 66: 1-19 (1977), or Handbook of Pharmaceutical Salts: Properties, Selection, and Use (P. Heinrich Stahl and Camille G. Wermuth, ed., Wiley-VCH, 2002).

The term "solvate" refers to a substance formed by combining the compound of the present disclosure with a stoichiometric or non-stoichiometric amount of solvent. Solvent molecules in the solvate can exist in an ordered or non-ordered arrangements. The solvent includes, but is not limited to, water, methanol, ethanol, etc.

In the term "solvate of pharmaceutically acceptable salt", the "pharmaceutically acceptable salt" and the "solvate" are as described above, and the "solvate of the pharmaceutically acceptable salt" refers to a substance formed by combining the compound of the present disclosure, a relatively non-toxic and pharmaceutically acceptable acid or alkali of 1 with a stoichiometric or non-stoichiometric amount of solvent of 2. The "solvate of pharmaceutically acceptable salt" includes, but is not limited to, a hydrochloric acid monohydrate of the compound of the present disclosure.

The term "tautomer" refers to a functional group isomer generated by the rapid movement of a certain atom in a molecule between two positions. For example, acetone and 1-propen-2-ol can be converted into each other by the rapid movement of a hydrogen atom between oxygen and α-carbon.

The term "crystal form" refers to a crystal form in which ions or molecules are strictly and periodically arranged in a three-dimensional space in a certain way, and have a regular repetition interval at a certain interval; due to the difference in the periodic arrangement, a plurality of crystal forms, i.e., polymorphism phenomena, may exist.

The term "alkyl" refers to a linear or branched alkyl having the specified number of carbon atoms. Examples of alkyl include methyl, ethyl, n-propyl, isopropyl, n-butyl, tert-butyl, isobutyl, sec-butyl, n-pentyl, n-hexyl, and similar alkyl.

The term "heterocycloalkyl" refers to a saturated monocyclic group containing heteroatoms.

The term "ophthalmic pharmaceutical excipient" refers to a vehiculum and additive that are used during medicament production or prescription deployment, which includes all other substance in a pharmaceutical formulation rather than active ingredients. For details, see Pharmacopoeia of the People's Republic of China (2015 edition) part-IV, or Handbook of Pharmaceutical Excipients (Raymond C Rowe, 2009 Sixth Edition).

The term "treatment" refers to a therapeutic therapy. Regarding to a specific disease, the treatment refers to: (1) alleviation of one or more biological manifestations of a disorder or disease, (2) interfering with (a) one or more points in the biological cascade leading to or causing a disease or (b) one or more biological manifestations of the disease, (3) improvement of one or more symptoms, effects or side effects associated with the disease, or one or more symptoms, effects or side effects associated with the disease or treatment thereof, or (4) slowdown of the progression of a disease or one or more biological manifestations of the disease.

The term "therapeutically effective amount" refers to an amount of compound that, when administered to a patient in need thereof, is sufficient to effectively treat the disorders or diseases described herein. The "therapeutically effective amount" is changed according to the compound, the disease and its severity, and the age of the patient to be treated, but can be adjusted as needed by those skilled in the art.

The term "patient" refers to any animal, preferably a mammal, and most preferably a human, to whom the compound or composition will be or has been administered according to embodiments of the present disclosure. The term "mammal" includes any mammal. Examples of the mammal include, but are not limited to, cow, horse, sheep, pig, cat, dog, mouse, rat, rabbit, guinea pig, monkey, human, etc., and most preferably a human.

The term "conical neovascular disease" refers to an ophthalmic disease caused by conical neovascularization.

The above preferred conditions can be combined arbitrarily to obtain preferred embodiments of the present disclosure without violating common knowledge in the art.

All reagents and raw materials used in the present disclosure are commercially available.

The positive and progressive effect of the present disclosure is that the naphthylurea compounds of the present disclosure can treat the corneal neovascular disease by administration method of eye drops, fill the gaps in the field, and have significant social and economic benefits.

DETAILED DESCRIPTION OF THE PREFERRED EMBODIMENT

The present disclosure will be further described below with reference to embodiments, but it is not therefore limited to the scope of the embodiment. Experimental methods without specific conditions in the following embodiments are selected according to conventional methods and conditions, or according to products' instructions.

Structures of compounds used in the following embodiments are as follows:

compound IV:

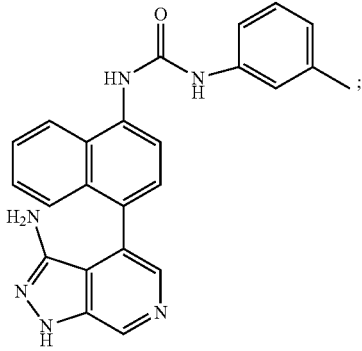

compound III:

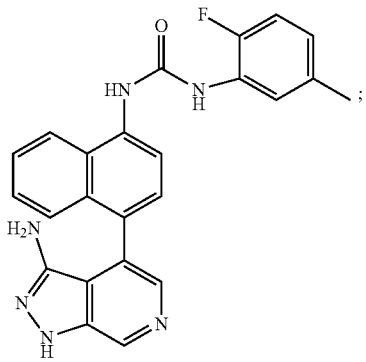

compound V:

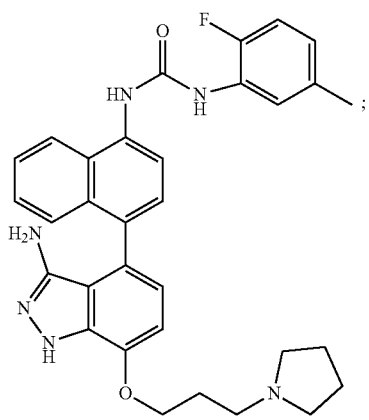

compound VI:

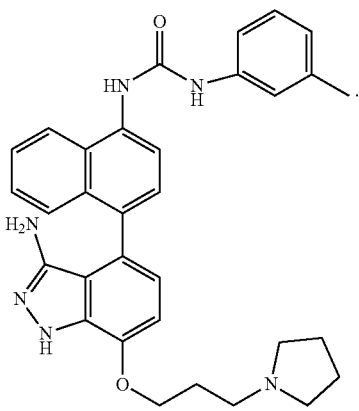

Effect Embodiment 1 Inhibition Test on Corneal Neovascularization in Rabbits

1 Test Materials 1.1 Experimental System
1.1.1 Experimental Animal

Species and level: Japanese white rabbit, ordinary grade;
number and sex: 24 male rabbits were purchased, among which 20 rabbits were selected when modeling;
age and weight: 4- to 6-month-old, the weight was 2.305-3.280 kg when modeling;
source: Sichuan Laboratory Animal Special Committee Farm, holding the production license No. SCXK (Chuan) 2018-14. Quality certificate issuing and printing authority: Science and Technology Department of Sichuan Province.

Environmental adaptation period after entering the laboratory: the main inspection contents comprised the general state, body weight measurement, ophthalmic examination, and conical fluorescent staining of the animal. All the animals finally comprised in the official test were healthy and did not have abnormal ocular surface.

Animal welfare: the IACUC number of the present test was IACUC-B2019030-P001-01. The method used in the present animal test was a highly recognized operation method determined by consulting a large number of literatures. During the test, the animals experiencing brief, mild pain or discomfort were appropriately administrated with local anaesthetics to alleviate the symptoms.

1.1.2 Rearing Site and Conditions

A zone (Building 1) in the common animal house of Chengdu WestChina-Frontier Pharma Tech Co., Ltd. (the experimental animal license No. SYXK (Chuan) 2013-123).

Type of rearing cage: stainless steel rabbit cage (L×W×H: 550 mm×550 mm×400 mm);
rearing density: 1 rabbit/cage.
Rearing environmental condition standard: the national standard GB14925-2010 of the People's Republic of China;
temperature: room temperature 22.62 to 24.97° C. (daily temperature difference: 0.57 to 1.56° C.);
humidity: relative humidity 45.44 to 72.40%;
illumination: artificial illumination with alternating lighting and darkness for 12/12 hours.
Type of feed: feed for rabbit growth and reproduction purchased from Beijing Keao Xieli Feed Co., Ltd. Feed production license: Beijing feed License (2014) 06054;

feeding method: free intake.

Water supplying method: water for experimental animals; placed in drinking bottle, free intake.

1.1.3 Animal Labelling Method

During environmental adaptation period: ear tags and cage cards were used as animal identification labels;

after grouping: ear tags and cage cards were used as animal identification labels.

1.2. Test Samples 1.2.1 Basic Information

Test Sample 1

Name or code: A01 eye drops;

source: Suzhou Ruiming New Drug Research and Development Co., Ltd.;

main components are shown in Table 1:

TABLE 1

| A01 eye drops | |
|---|---|
| Component | Source |
| Compound IV | Prepared by the method disclosed in the specific embodiments in the Chinese invention patent CN 103524421 A |
| Polyethylene glycol 600 | Medicament excipient grade, manufacturer: Hunan Huari Pharmaceutical Co., Ltd. |
| Benzalkonium chloride | CAS No.: 8001-54-5, manufacturer: Adamas, reagent grade |
| Sodium chloride | CAS No.: 7647-14-5, AR grade, manufacturer: Sinopharm Chemical Reagent Co., Ltd. |
| Tyloxapol | CAS No.: 25301-02-4, reagent grade, manufacturer: Aladdin Reagents |

Appearance: skin color suspension;

specification: 20 mg/mL; lot No.: 201906001; pH: 7.4; osmotic pressure: unknown;

expiry date: Dec. 3, 2019;

storage conditions and precautions: sealed and stored at room temperature;

storage place: the test sample management department of the institution;

protective measures: conventional (mask, gloves, and work clothes).

Test Sample 2

Name or code: A02 eye drops;

source: Suzhou Ruiming New Drug Research and Development Co., Ltd.;

main components are shown in Table 2:

TABLE 2

| A02 eye drops | |
|---|---|
| Component | Source |
| Compound III | Prepared by the method disclosed in the specific embodiments in the Chinese invention patent CN 103524421 A |
| Polyethylene glycol 600 | Medicament excipient grade, manufacturer: Hunan Huari Pharmaceutical Co., Ltd. |
| Benzalkonium chloride | CAS No.: 8001-54-5, manufacturer: Adamas, reagent grade |
| Sodium chloride | CAS No.: 7647-14-5, AR grade, manufacturer: Sinopharm Chemical Reagent Co., Ltd. |
| Tyloxapol | CAS No.: 25301-02-4, reagent grade, manufacturer: Aladdin Reagents |

Appearance: skin color suspension;

specification: 20 mg/mL; lot No.: 201906001; pH: 7.4; osmotic pressure: unknown;

expiry date: Dec. 3, 2019;

storage conditions and precautions: sealed and stored at room temperature;

storage place: the test sample management department of the institution;

protective measures: conventional (mask, gloves, and work clothes).

Test Sample 3

Name or code: A03 eye drops;

source: Suzhou Ruiming New Drug Research and Development Co., Ltd.;

main components are shown in Table 3:

TABLE 3

A03 eye drops

| Component | Source |
|---|---|
| Compound V | Prepared by the method disclosed in the specific embodiments in the Chinese invention patent CN 103524421 A |
| Polyethylene glycol 600 | Medicament excipient grade, manufacturer: Hunan Huari Pharmaceutical Co., Ltd. |
| Benzalkonium chloride | CAS No.: 8001-54-5, manufacturer: Adamas, reagent grade |
| Sodium chloride | CAS No.: 7647-14-5, AR grade, manufacturer: Sinopharm Chemical Reagent Co., Ltd. |
| Tyloxapol | CAS No.: 25301-02-4, reagent grade, manufacturer: Aladdin Reagents |

Appearance: light red suspension;
specification: 20 mg/mL; lot No.: 201906001; pH: 7.4; osmotic pressure: unknown;
expiry date: Dec. 3, 2019;
storage conditions and precautions: sealed and stored at room temperature;
storage place: the test sample management department of the institution;
protective measures: conventional (mask, gloves, and work clothes).

Test Sample 4
Name or code: B01 eye drops;
source: Suzhou Ruiming New Drug Research and Development Co., Ltd.;
main components are shown in Table 4:

TABLE 4

B01 eye drops

| Component | Source |
|---|---|
| Compound VI | Prepared by the method disclosed in the specific embodiments in the Chinese invention patent CN 103524421 A |
| Polyethylene glycol 600 | Medicament excipient grade, manufacturer: Hunan Huari Pharmaceutical Co., Ltd. |
| Benzalkonium chloride | CAS No.: 8001-54-5, manufacturer: Adamas, reagent grade |
| Sodium chloride | CAS No.: 7647-14-5, AR grade, manufacturer: Sinopharm Chemical Reagent Co., Ltd. |
| Tyloxapol | CAS No.: 25301-02-4, reagent grade, manufacturer: Aladdin Reagents |

Appearance: off-white suspension;
specification: 20 mg/mL; lot No.: 201906001; pH: 7.4; osmotic pressure: unknown;
expiry date: Dec. 3, 2019;
storage conditions and precautions: sealed and stored at room temperature;
storage place: the test sample management department of the institution;
protective measures: conventional (mask, gloves, and work clothes).

1.2.2 Preparation of Administration Formulations
Preparation method: in the biological safety cabinet, the A01, A02, A03, and B01 eye drops were shaken well, and 1.8 mL of each test sample was subpackaged respectively and dispensed directly after subpackaging;
frequency of preparation: once a day;
labelling method after preparation: the dispensed A01, A02, A03, and B01 administration formulations were labelled with green, blue, red, and yellow tags, respectively, and indicated with the test number, test substance name, storage conditions, expiry date, responsible person, preparation product number, and dispensing date;
temporary storage conditions and expiry date after preparation and subpackaging: sealed and stored at room temperature and used within the same day.

2 Test Method and Observation Indexes 2.1 Animal Grouping

Group design: a model control group, an A01 group, an A02 group, an A03 group, and a B01 group. For specific grouping details, see Table 5.

Number of animals and sex: 4 male rabbits/group;
grouping method: the rabbits were randomly grouped by using the PRISTIMA data system according to the weight and sex of the rabbits;
remaining animal disposal: after grouping, the remaining animals were handed over to the Laboratory Animal Management Department.

TABLE 5

| Group | Number of animals Male | Serial No. of animals Male |
|---|---|---|
| Model control group | 4 | 1M001, 1M002, 1M003, 1M004 |
| A01 group | 4 | 2M001, 2M002, 2M003, 2M004 |
| A02 group | 4 | 3M001, 3M002, 3M003, 3M004 |
| A03 group | 4 | 4M001, 4M002, 4M003, 4M004 |
| B01 group | 4 | 5M001, 5M002, 5M003, 5M004 |

Note: the first digit of the serial number of the animal represents the group (1, 2, 3, 4, and 5 represent the model control group, the A01 group, the A02 group, the A03 group, and the B01 group, respectively). The second alphabet represents the sex (M represents male, and F represents female), and the third, fourth, and fifth digits represent the sequence number of the animal 2.2 Modelling Method The Japanese white rabbits were narcotized for the first time with pentobarbital sodium (25 mg/kg, injected via ear vein), and the periphery of the eye was sterilized with 0.5% povidone-iodine and covered with a specialized ophthalmic operation towel, and the upper and lower eyelids were separated by using an eye speculum to expose the eyeball. 1-2 drops of oxybuprocaine hydrochloride eye drops were administrated to both eyes for local anaesthesia, then gentian violet was used to radially label the upper ¼ of the cornea, and the first line of corneal sutures with a length of about 3.8 mm was sutured to a position, parallel to and about 1.5 mm away from the corneal limbus, of the corneal stroma; the second line of sutures with a length of about 3 mm was sutured to a position, parallel to and 1.5 mm away from the first line; the last suture was sutured at the vertex of a triangle 1.5 mm away from the second line of sutures. Both eyes were modelled.

After operation, antibiotic was administrated to the eyes three times a day for continuous three days.

2.3 Dosage Design of Administration and Administration

In the present test, the A01, A02, A03, and B01 administration formulation were administrated to the A01 group, the A02 group, the A03 group, and the B01 group, respectively. 0.1% sodium chloride sterile water for injection was administrated to the model control group. The eye drops were administrated to the animals in each group from the second day after modelling. Dosage design is shown in Table 6:

TABLE 6

Dosage design table

| Group | Administration route | Administration dosage mg/eye | Administration concentration mg/mL | Administration volume μL/eye | Number of animals (individual) | Number of eyeballs |
|---|---|---|---|---|---|---|
| Model control group | Eye-drop | — | — | 50 | 4 | 8 |
| A01 group | Eye-drop | 1 | 20 | 50 | 4 | 8 |
| A02 group | Eye-drop | 1 | 20 | 50 | 4 | 8 |
| A03 group | Eye-drop | 1 | 20 | 50 | 4 | 8 |
| B01 group | Eye-drop | 1 | 20 | 50 | 4 | 8 |

Administration route: eye drop administration to both eyes;

reason for selecting the administration route: the administration route was consistent with the proposed clinical route;

frequency of administration: administration started from the second day after modelling, and was carried out 4 times/day with an interval of not less than 4 hours for continuous 14 days;

administration volume: 50 μL/eye;

administration method: the lower eyelid of the animal was opened to expose the conjunctival sac, and the test sample or control sample was directly administrated into the conjunctival sac of the eye of the rabbit, and the eyelid was gently closed for about 8 to 10 s;

2.4 Observation Indexes 2.4.1 Observation of General State 2.4.1.1 Observation Time and Frequency Animal breeder: once a day;

test personnel: the administration period was observed at least once per day. If toxicity symptoms appeared, the number of observations could be increased;

vet/veterinary technician: at least once per week.

2.4.1.2 Observation Animal and Content

Observation animal: the live rabbits in each group;

observation content:

animal breeder: death and ingestion of food and water;

test personnel and vet: the observation contents included, but were not limited to, conditions such as local reactions of the eyes of the rabbit (with or without congestion, edema, increased secretion, etc.), appearance signs, hair, general behavior and activities, mental state, glandular secretion, skin and mucosa color, breathing state, faeces appearance, reproductive organ, and death, and other toxic symptoms.

2.4.2 Slit-Lamp Examination

Examination time: after modelling, the rabbits were examined once before and on the second, fourth, and seventh days after administration;

examination animal: all live animals in each group;

examination method: the anterior segment of the eye, i.e., the structures of the conjunctiva, cornea, anterior chamber, iris, lens, etc., was examined with a slit-lamp microscope, and abnormal conditions such as eye inflammation, e.g., conical opacity, ulcer, etc., were focused on observation.

2.4.3 Measurement of the Area of Corneal Neovascularization

Examination time: the rabbits were examined once on the seventh and fourteenth days after administration;

examination animal: all live animals in each group;

examination method: the digital camera connected to the slit-lamp was used to collect the photo of corneal neovascularization, and then the photo analysis software was used to analyze the photo;

measurement indicators: the area of the conical neovascularization, and a percentage of the area of conical neovascularization in the area of the cornea.

2.4.4 Gross Anatomy

Examination time: on the fourteenth day after administration;

animal to be dissected: four rabbits in the model control group, and four rabbits in the administration groups;

anaesthesia and anatomy method: the rabbits were narcotized with pentobarbital sodium according to the weight (30 mg/kg, by means of intravenous injection, and the dosage could be adjusted according to the health state of the animal), and the rabbits were hemorrhagic and euthanized by abdominal aorta or femoral artery bleeding, and the unilateral lower eyeballs were taken out and fixed and stored in modified Davidson's fixative solution.

3 Results

3.1 General Conditions

After modelling and before the end of the test, the rabbits in each group were in good mental state, and had normal autonomic activity, the skin and hair were clean, and no abnormal response was found in food intake, feces, and urine. The rabbit numbered 2M004 in the A01 group had an accident during the operation, so the data of this animal was missing.

3.2 Modelling Conditions and Slit-Lamp Examination

On the second day after modelling, in the rabbits in the model control group, the A01 group, the A02 group, the A03 group, and the B01 group, the corneal sutures were in place, and slight edema of the cornea and conjunctiva occurred, which indicated that the models were successfully made.

In the model control group, the A01 group, the A02 group, the A03 group, and the B01 group on the seventh and fourteenth days after administration, the slit-lamp examination showed that the corneal sutures were in place, slight edema of the cornea at the suture site occurred, and corneal neovascularization developed from the corneal edge to the corneal vertex, which indicated that neovascularization grew with time.

3.3 Corneal Neovascularization Area Examination

TABLE 7

Individual data (mm$^2$) of the area of corneal neovascularization of Japanese white rabbits

| Group | Serial No. of animals | Eye | Seventh day after administration | Fourteenth day after administration |
|---|---|---|---|---|
| Model control group | 1M001 | Right eye | 1.87 | 4.63 |
| | 1M001 | Left eye | 3.38 | 8.96 |
| | 1M002 | Right eye | 5.32 | 5.51 |
| | 1M002 | Left eye | 6.2 | 10.82 |
| | 1M003 | Right eye | 4.11 | 4.2 |
| | 1M003 | Left eye | 3.37 | 8.65 |
| | 1M004 | Right eye | 2.59 | 7.78 |
| | 1M004 | Left eye | 1.5 | 9.94 |
| A01 group | 2M001 | Right eye | 0.00 | 4.64 |
| | 2M001 | Left eye | 0.00 | 4.01 |
| | 2M002 | Right eye | 0.68 | 5.63 |
| | 2M002 | Left eye | 0.75 | 10.26 |
| | 2M003 | Right eye | 0.00 | 2.01 |
| | 2M003 | Left eye | 3.11 | 5.76 |
| A02 group | 3M001 | Right eye | 0.00 | 2.74 |
| | 3M001 | Left eye | 3.22 | 4.6 |
| | 3M002 | Right eye | 0.00 | 3.58 |
| | 3M002 | Left eye | 1.19 | 0.00 |
| | 3M003 | Right eye | 0.00 | 3.94 |
| | 3M003 | Left eye | 1.2 | 0.00 |
| | 3M004 | Right eye | 0.00 | 6.02 |
| | 3M004 | Left eye | 0.00 | 3.88 |
| A03 group | 4M001 | Right eye | 0.00 | 1.17 |
| | 4M001 | Left eye | 0.00 | 3.26 |
| | 4M002 | Right eye | 2.12 | 6.59 |
| | 4M002 | Left eye | 0.00 | 6.91 |
| | 4M003 | Right eye | 1.41 | 2.25 |
| | 4M003 | Left eye | 0.00 | 0.00 |
| | 4M004 | Right eye | 0.00 | 3.23 |
| | 4M004 | Left eye | 0.00 | 3.79 |
| B01 group | 5M001 | Right eye | 1.91 | 4.6 |
| | 5M001 | Left eye | 1.74 | 6.95 |
| | 5M002 | Right eye | 0.00 | 6.04 |
| | 5M002 | Left eye | 1.1 | 2.42 |
| | 5M003 | Right eye | 1.54 | 5.71 |
| | 5M003 | Left eye | 0.00 | 9.07 |
| | 5M004 | Right eye | 2.54 | 17.07 |
| | 5M004 | Left eye | 0.00 | 10.44 |

TABLE 8

Individual data (%) of a percentage of the area of corneal neovascularization in the area of the cornea of Japanese white rabbits

| Group | Serial No. of animals | Eye | Seventh day after administration | Fourteenth day after administration |
|---|---|---|---|---|
| Model control group | 1M001 | Right eye | 3.2 | 7.93 |
| | 1M001 | Left eye | 5.13 | 13.6 |
| | 1M002 | Right eye | 8.63 | 8.94 |
| | 1M002 | Left eye | 12.78 | 22.31 |
| | 1M003 | Right eye | 6.2 | 6.34 |
| | 1M003 | Left eye | 6.7 | 17.19 |

TABLE 8-continued

Individual data (%) of a percentage of the area of corneal neovascularization in the area of the cornea of Japanese white rabbits

| Group | Serial No. of animals | Eye | Seventh day after administration | Fourteenth day after administration |
|---|---|---|---|---|
| | 1M004 | Right eye | 7 | 21.03 |
| | 1M004 | Left eye | 3.7 | 24.53 |
| A01 group | 2M001 | Right eye | 0.00 | 9.7 |
| | 2M001 | Left eye | 0.00 | 7.22 |
| | 2M002 | Right eye | 1.16 | 9.63 |
| | 2M002 | Left eye | 1.54 | 21.05 |
| | 2M003 | Right eye | 0.00 | 5 |
| | 2M003 | Left eye | 7.14 | 13.23 |
| A02 group | 3M001 | Right eye | 0.00 | 6.14 |
| | 3M001 | Left eye | 6.5 | 9.28 |
| | 3M002 | Right eye | 0.00 | 6.83 |
| | 3M002 | Left eye | 2.22 | 0.00 |
| | 3M003 | Right eye | 0.00 | 8.12 |
| | 3M003 | Left eye | 2.07 | 0.00 |
| | 3M004 | Right eye | 0.00 | 12.56 |
| | 3M004 | Left eye | 0.00 | 8.45 |
| A03 group | 4M001 | Right eye | 0.00 | 2.57 |
| | 4M001 | Left eye | 0.00 | 4.99 |
| | 4M002 | Right eye | 3.33 | 10.34 |
| | 4M002 | Left eye | 0.00 | 13.17 |
| | 4M003 | Right eye | 2.77 | 4.41 |
| | 4M003 | Left eye | 0.00 | 0.00 |
| | 4M004 | Right eye | 0.00 | 5.5 |
| | 4M004 | Left eye | 0.00 | 6.27 |
| B01 group | 5M001 | Right eye | 3.78 | 9.09 |
| | 5M001 | Left eye | 3.57 | 14.24 |
| | 5M002 | Right eye | 0.00 | 9.8 |
| | 5M002 | Left eye | 2.19 | 4.81 |
| | 5M003 | Right eye | 3.08 | 11.43 |
| | 5M003 | Left eye | 0.00 | 17.75 |
| | 5M004 | Right eye | 6.2 | 41.66 |
| | 5M004 | Left eye | 0.00 | 20.46 |

In the model control group on the seventh and fourteenth days after administration, the area of corneal neovascularization showed a gradually increasing trend, and was 3.5±1.6 mm$^2$ and 7.6±2.5 mm$^2$, respectively, and the percentage of the area of conical neovascularization was 6.7±3.0% and 15.2±7.1%, respectively.

In the A01 group on the seventh and fourteenth days after administration, the area of conical neovascularization was gradually increased, and was 0.6±1.1 mm$^2$ and 4.0±3.4 mm$^2$, respectively, and the percentage of the area of corneal neovascularization was 1.2±2.5% and 8.2±7.0%, respectively. Differences between the area of corneal neovascularization and its percentage in the A01 group on the seventh day after administration and those in the model control group had statistical significance (P≤0.05).

In the A02 group on the seventh and fourteenth days after administration, the area of conical neovascularization was gradually increased, and was 0.7±1.2 mm$^2$ and 3.1±2.1 mm$^2$, respectively, and the percentage of the area of corneal neovascularization was 1.3±2.3% and 6.4±4.4%, respectively. Differences between the area of corneal neovascularization and its percentage in the A02 group on the seventh day after administration and those in the model control group had statistical significance (P≤0.05), and differences between the area of corneal neovascularization in the A02 group on the fourteenth day after administration and those in the model control group had statistical significance (P≤0.05).

In the A03 group on the seventh and fourteenth days after administration, the area of corneal neovascularization was gradually increased, and was 0.4±0.8 mm$^2$ and 3.4±2.4 mm$^2$, respectively, and the percentage of the area of corneal neovascularization was 0.8±1.4% and 5.9±4.2%, respectively. Differences between the area of corneal neovascularization and its percentage in the A03 group on the seventh and fourteenth days after administration and those in the model control group had statistical significance (P≤0.05).

In the B01 group on the seventh and fourteenth days after administration, the area of conical neovascularization was gradually increased, and was 1.1±1.0 mm$^2$ and 7.8±4.5 mm$^2$, respectively, and the percentage of the area of corneal neovascularization was 2.4±2.3% and 16.2±11.4%, respectively. Differences between the area of conical neovascularization and its percentage in the B01 group on the seventh day after administration and those in the model control group had statistical significance (P≤0.05).

4 Conclusions

In conclusion, in the present test, corneal neovascularization in the Japanese white rabbits was induced by using conical sutures, and A01, A02, A03 and B01 were administered via eye drops and treated at 4 mg/eye/day; a slit-lamp examination was performed on the second, fourth, seventh days after administration; and the area of corneal neovascularization on the seventh and fourteenth days after administration was recorded.

Results indicate that A03 administrated according to the dosage of 4 mg/eye/day (1 mg/eye/time) had an obvious inhibitory effect on conical neovascularization in the rabbits, A02 administrated according to the dosage of 4 mg/eye/day (1 mg/eye/time) had a certain inhibitory effect on corneal neovascularization in the rabbits, A01 administrated according to the dosage of 4 mg/eye/day (1 mg/eye/time) had a tendency to inhibit corneal neovascularization in rabbits, and B01 administrated according to the dosage of 4 mg/eye/day (1 mg/eye/time) had an obvious inhibitory effect on corneal neovascularization on the seventh day after administration, but had no obvious inhibitory effect on conical neovascularization on the fourteenth day (late stage) after administration. That is, in the models, the above compounds had different inhibitory effects on corneal neovascularization in the rabbits.

Although the specific embodiments of the present disclosure have been described above, those skilled in the art should understand that these are only examples, and various changes and amendments may be made to these implementation modes without departing from the principle and essence of the present disclosure. Therefore, the scope of protection of the present disclosure is subject to the appended claims.

What is claimed is:

1. A method for treating a corneal neovascular disease in a patient in need thereof, comprising: administering an effective amount of a substance A to the patient wherein, the substance A is a naphthylurea compound as shown in formula V, a pharmaceutically acceptable salt thereof, a solvate thereof, a solvate of the pharmaceutically acceptable salt thereof, or a tautomer thereof;

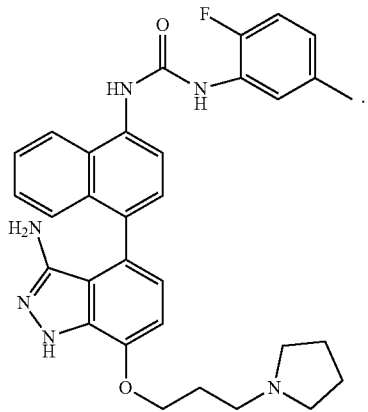

V

2. The method according to claim 1, wherein, the dosage form of the medicament is an eye drop.

3. A pharmaceutical composition, wherein, the pharmaceutical composition comprises the substance A according to claim 1 and an ophthalmic pharmaceutical excipient.

4. The pharmaceutical composition according to claim 3, wherein, the dosage form of the pharmaceutical composition is an eye drop;
or, the pharmaceutical composition is a pharmaceutical composition for treating a corneal neovascular disease.

5. The method according to claim 1, wherein, the method of "administration" is in the form of eye drops;
or, the patient is a mammal;
or, based on the substance A, a single dosage range of the substance A or the pharmaceutical composition is 1-3 mg/eye;
or, the frequency of administration of the substance A or the pharmaceutical composition is four times a day.

6. The method according to claim 2, wherein, in the eye drop, the mass concentration of the substance A is 10-30 mg/mL.

7. The method according to claim 6, wherein, in the eye drop, the mass concentration of the substance A is 20 mg/mL.

8. The pharmaceutical composition according to claim 4, wherein, in the eye drop, the mass concentration of the substance A is 10-30 mg/mL.

9. The pharmaceutical composition according to claim 8, wherein, in the eye drop, the mass concentration of the substance A is 20 mg/mL.

10. The method according to claim 5, wherein, the patient is a rabbit or human.

11. A method for treating a corneal neovascular disease in a patient in need thereof, comprising: administering an effective amount of the pharmaceutical composition according to claim 3 to the patient.

12. The method according to claim 1, wherein, the corneal neovascular disease is late stage corneal neovascular disease.

13. The method according to claim 11, wherein, the corneal neovascular disease is late stage corneal neovascular disease.

* * * * *